(12) United States Patent
Park et al.

(10) Patent No.: US 8,982,793 B2
(45) Date of Patent: Mar. 17, 2015

(54) METHOD FOR CONTROLLING CHANNEL ACCESS IN WIRELESS LOCAL AREA NETWORK AND APPARATUS FOR THE SAME

(75) Inventors: Hyun Gu Park, Daejeon (KR); Sok Kyu Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 246 days.

(21) Appl. No.: 13/612,694

(22) Filed: Sep. 12, 2012

(65) Prior Publication Data

US 2013/0208656 A1 Aug. 15, 2013

(30) Foreign Application Priority Data

Feb. 10, 2012 (KR) ........................ 10-2012-0013661

(51) Int. Cl.
*H04W 74/04* (2009.01)
*H04W 74/00* (2009.01)
(52) U.S. Cl.
CPC ..................................... *H04W 74/00* (2013.01)
USPC .......................................................... 370/328
(58) Field of Classification Search
CPC ..... H04W 84/18; H04W 84/12; H04W 80/04; H04W 88/06; H04W 88/08; H04W 72/0446; H04W 74/002; H04W 74/08; H04W 84/08; H04W 76/02; H04W 72/04; H04W 74/04; H04W 74/0816; H04W 74/0825; H04W 56/0045
USPC ......... 370/310, 322, 326, 328, 336, 338, 341, 370/345, 395.4, 442, 445–448, 458, 370/461–462, 508, 348, 329
See application file for complete search history.

(56) References Cited

U.S. PATENT DOCUMENTS

| | | | |
|---|---|---|---|
| 2006/0215686 A1* | 9/2006 | Takeuchi | 370/445 |
| 2008/0212604 A1* | 9/2008 | Liu | 370/448 |
| 2009/0279470 A1* | 11/2009 | Seok | 370/312 |
| 2010/0054214 A1* | 3/2010 | Igarashi et al. | 370/336 |
| 2011/0305216 A1* | 12/2011 | Seok | 370/329 |

FOREIGN PATENT DOCUMENTS

KR 10-2010-0125035 A 11/2010

* cited by examiner

*Primary Examiner* — Kwang B Yao
*Assistant Examiner* — Syed M Bokhari

(57) ABSTRACT

A method for controlling channel access performed by an access point (AP) in a wireless system is provided. The method includes: receiving at least one frame from at least one station (STA), respectively, for a specific time period, each frame including information on a contention window (CW) used when the frame is transmitted; processing information one at least one CW for each STA; determining whether to control the channel access based on the processed information on the CW; selecting an abnormal STA candidate group if it is determined that the channel access control is performed; and controlling the channel access to each STA included in the abnormal candidate STA group.

16 Claims, 7 Drawing Sheets

METHOD FOR CONTROLLING CHANNEL ACCESS IN WIRELESS LOCAL AREA NETWORK AND APPARATUS FOR THE SAME

CROSS-REFERENCE TO RELATED APPLICATIONS

This application claims the benefit of priority of Korean Patent Application No. 10-2012-0013661 filed on Feb. 10, 2012, which is incorporated by reference in their entirety herein.

BACKGROUND OF THE INVENTION

1. Field of the invention

The present invention relates to wireless communication, and more particularly, to a method for controlling channel access of a station (STA) by an access point (AP) in a wireless local area network system and an apparatus for supporting the same.

2. Related Art

Recently, various wireless communication technologies have been developed with the development of information communication technology. Among them, a wireless local area network (WLAN) is a technique allowing mobile terminals such as personal digital assistants (PDAs), lap top computers, portable multimedia players (PMPs), and the like, to wirelessly access the Internet at homes, in offices, or in a particular service providing area, based on a radio frequency technology.

A technology related to a WLAN system has been spotlighted as a wireless communication technology providing a high speed data service in an unauthorized band. Particularly, unlike an existing cellular communication system, when an access point (AP) serving as a base station is connected only to a wired network including a distribution system and a power supply, the access point may be easily installed by anyone, has a cheap cost, and may perform data communication. Therefore, the access point has been generalized.

After the institute of electrical and electronics engineers (IEEE) 802 which is a standardization organization of a WLAN technology was established on February, 1980, a number of standardization operations have been conducted. An initial WLAN technology has supported a speed of 1 to 2 Mbps in frequency hopping, spread spectrum, infrared communication, or the like, using a frequency of 2.4 GHz through the IEEE 802.11. Recently, a speed up to 54 Mpbs may be supported by applying orthogonal frequency division multiplex (OFDM). In addition, in the IEEE 802.11, various technology standards such as improvement of quality of service (QoS), access point protocol compatibility, security enhancement, radio resource measurement, wireless access for a vehicular environment, fast roaming, a mesh network, interworking with an external network, wireless network management, and the like, have been put to practical use or have been developed.

In addition, as a technology specification relatively recently established in order to overcome a limitation for a communication speed that has been pointed out as a disadvantage in the WLAN, there is an IEEE 802.11n. An object of the IEEE 802.11n is to increase a speed and reliability of a wireless network and extend an operating distance of the wireless network. More specifically, the IEEE 802.11n is based on multiple inputs and multiple outputs (MIMO) technology in which multiple antennas are used at both of a transmitting end and a receiving end in order to support a high throughput (HT) having a maximum data processing speed of 540 Mbps or more, minimize a transmission error, and optimize a data speed. Further, in this specification, a coding scheme of transmitting several overlapped duplicates may be used in order to increase data reliability, and an orthogonal frequency division multiplexing (OFDM) scheme may also be used in order to increase a speed.

The characteristics of the WLAN system differentiated from other wireless communication systems perform communication using a shared wireless medium to support a channel access method based on a contention based medium access. That is, wireless apparatuses supporting the WLAN are not controlled by a channel access order and/or ranking that is a wireless medium but access a medium by contention therebetween.

Meanwhile, there may be a wireless apparatus that is set to implement the channel access unlike the general wireless apparatus for supporting the WLAN. When the above-mentioned abnormal wireless apparatuses and the general normal wireless apparatuses contend each other for accessing the channel, collision occurs therebetween, such that the normal channel access cannot be performed. Therefore, a need exists for a method and an apparatus for supporting normal channel access of the wireless apparatuses in the WLAN system in which the abnormal wireless apparatuses and the normal wireless apparatuses set for accessing the channel differently from the general channel access rules coexist.

SUMMARY OF THE INVENTION

The present invention provides a method for controlling channel access of a station (STA) by an access point (AP) in a wireless local area network and an apparatus for supporting the same.

In an aspect, a method for controlling channel access performed by an access point (AP) in a wireless system is provided. The method includes: receiving at least one frame from at least one station (STA), respectively, for a specific time period, each frame including information on a contention window (CW) used when the frame is transmitted; processing information one at least one CW for each STA; determining whether to control the channel access based on the processed information on the CW; selecting an abnormal STA candidate group if it is determined that the channel access control is performed; and controlling the channel access to each STA included in the abnormal candidate STA group.

The information on the CW is a CW reference value that may be on the basis of determining the CW.

The step of processing of the information on the at least one CW may include determining a CW average value that is an average value for the at least one CW reference value.

The step of determining whether the channel access control is performed may include determining the channel access control to be performed when the CW average value is same to or greater than a specific control threshold value.

The step of processing of the information on the at least one CW may include determining an average CW reference value being an average value of the at least one CW reference value for each STA.

The step of selecting of the abnormal STA candidate group may include including a corresponding STA in the abnormal STA candidate group, if the average CW reference value is smaller than a specific marginal value based on the threshold value.

The step of controlling of the channel access for each STA may include terminating a coupling state with the corresponding STA included in the abnormal STA candidate group.

The CW reference value may be included in a medium access control (MAC) of the frame.

The frame may be a management action frame including information element that includes the information on the CW.

The CW reference value may satisfy the following Equation.

$$CW=2^n-1$$

(n is an integer and the CW reference value).

In another aspect, a wireless apparatus is provided. The apparatus includes: a transceiver that transmits and receives a wireless signal; and a processor operably coupled with the transceiver. The processor is configured for: receiving at least one frame from at least one station (STA), respectively, for a specific time period, each frame including information on a contention window (CW) used when the frame is transmitted, processing information one at least one CW for each STA, determining whether to control the channel access based on the processed information on the CW, selecting an abnormal STA candidate group if it is determined that the channel access control is performed, and controlling the channel access to each STA included in the abnormal candidate STA group.

The information on the CW may be a CW reference value that is on the basis of determining the CW.

The processing of the information on the at least one CW may include determining a CW average value that is an average value for the at least one CW reference value.

The determining whether the channel access control is performed may include determining the channel access control to be performed when the CW average value is same to or greater than a specific control threshold value.

The processing of the information on the at least one CW may include determining an average CW reference value being an average value of the at least one CW reference value for each STA.

The selecting of the abnormal STA candidate group may include including a corresponding STA in the abnormal STA candidate group, if the average CW reference value is smaller than a specific marginal value based on the threshold value.

The controlling of the channel access for each STA may include terminating a coupling state with the corresponding STA included in the abnormal STA candidate group.

The CW reference value may be included in a medium access control (MAC) of the frame.

The frame may be a management action frame including information element that includes the information on the CW.

The CW reference value may satisfy the following Equation.

$$CW=2^n-1$$

(n is an integer and the CW reference value).

Figure 1:
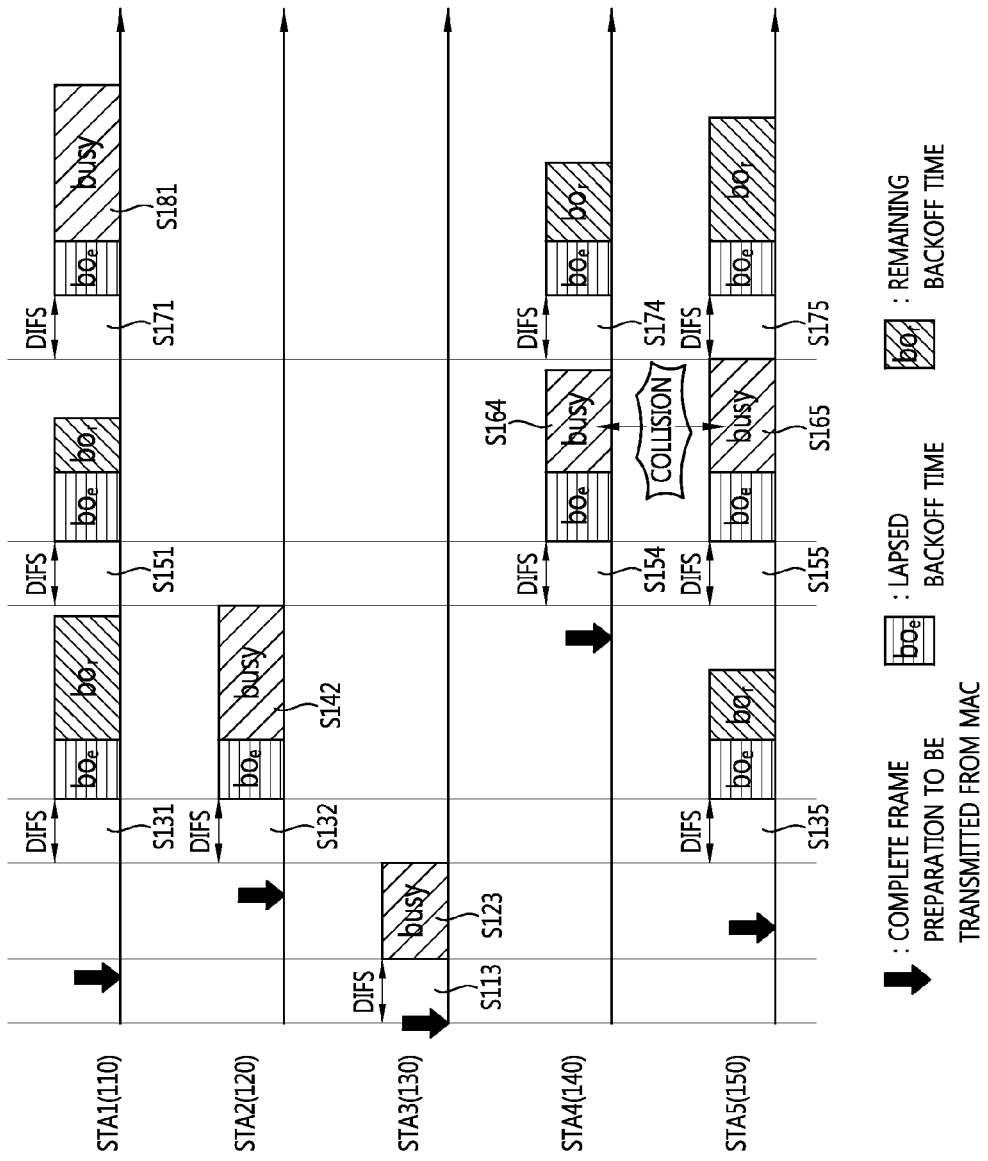
FIG. 1 is a diagram showing an example of a channel access method.

DESCRIPTION OF EXEMPLARY
EMBODIMENTS

Hereinafter, exemplary embodiments of the present invention will be described in detail with reference to the accompanying drawings. An exemplary embodiment to be described below may be usefully applied to transmission and reception of a wireless signal on a wireless local area network (WLAN) supporting a very high throughput (VHT). However, the following exemplary embodiment is not applied only to the VHT WLAN system, but may also be applied to a general wireless communication system supporting transmission and reception of a wireless signal based on an orthogonal frequency division multiplexing (OFDM).

The wireless local area network (WLAN) to which the exemplary embodiment of the present invention may be applied includes one or more basic service set (BSS). The BSS, which is a set of stations (STA) successfully synchronized with each other to communicate with each other, is not a concept indicating a specific area.

An infrastructure BSS includes one or more non-AP station (non-AP STA1, non-AP STA2, non-AP STA3, non-AP STA4, non-AP STA5), an access point (AP) providing a distribution service, and a distribution system (DS) connecting a plurality of APs to each other. In the infrastructure BSS, the AP manages the non-AP STAs.

On the other hand, an independent BSS (IBSS) is a BSS operating in an Ad-hoc mode. Since the IBSS does not includes the AP, there is no centralized management entity performing a management function at the center. That is, in the IBSS, the non AP STAs are managed in a distributed manner. In the IBSS, all the STAs may be formed of a mobile STA, and forms a self-contained network since an access to DS is not permitted.

The STA, which is any function entity including a medium access control (MAC) according to a specification of the IEEE 802.11 standard and a physical layer interface for a wireless medium, includes both of the AP and the non-AP station in a wide sense.

The non-AP STA, which is a STA that is not the AP, may also be called other names such as a mobile terminal a wireless device, a wireless transmit/receive unit (WTRU), a user equipment (UE), a mobile station (MS), a mobile subscriber unit, a user, or the like. Hereinafter, for convenience of explanation, the non-AP STA will be called the STA.

The AP is a function entity providing an access to the DS via a wireless medium for the STA associated with a corresponding AP. Communication between the STA in the infrastructure BSS including the AP is made via the AP in principle. However, in the case in which a direct link is set, communication may be directly made between the STAs. The AP may also be called a central controller, a base station (BS), a node-B a base transceiver system (BTS), a side controller, or the like.

A plurality of infrastructure BSSs including the BSS may be connected to each other a distribution system (DS). The plurality of BSS connected to each other through the DS is called an extended service set (ESS). The AP and/or the STAs included in the ESS may communicate with each other, and the STA may move from one BSS to another BSS while seamlessly communicating in the same ESS.

In the WLAN system according to the IEEE 802. 11, a basic access mechanism of a medium access control (MAC) is a carrier sense multiple access with collision avoidance (CSMA/CA). The CSMA/CA mechanism is referred to as a distributed coordination function (DCF) of the IEEE 802.11 MAC and basically adopts a "listen before talk" access mechanism. According to this type of access mechanism, the APs and/or the STAs sense a wireless channel or a medium prior to starting transmission. As a result of the sensing, if it is determined that the medium is an idle status, packet transmission starts through the corresponding medium. On the other hand, if it is sensed that the medium is in an occupied status, the corresponding APs and/or STAs do not start their own transmission and set a delayed period for medium access and is in a standby state for the delayed period.

The medium access method of the APs and/or the STAs will be described in more detail. Hereinafter, a medium that is accessed or may be accessed by the APs and/or the STAs is used together with the term, "channel". Further, a structure of data to be transmitted by the APs and/or the STAs and bitstream forms configuring the control information will be described using the terms such as a packet, a frame, a data unit, or the like.

When the APs and/or the STAs access the channel to transmit the frame, it confirms whether the channel is in an idle status. When the channel access is performed based on the DCF, confirming whether the channel is in the idle status may clear channel assessment (CCA) that senses the channel for a DCF interframe space (DIFS) period.

When the carrier is not sensed for the DIFS, the channel, it may be determined that the channel is in the idle status. When the carrier is sensed for the DIFS, it may be determined that the channel is in the occupied state.

The APs and/or the STAs are in the idle status after sensing the channel for the DIFS, the APs and/or the STAs may additionally wait by a random backoff period when the channel is sensed and then, is in the idle status and then, may transmit the frame. The random backoff period may avoid the collision between the APs and/or the STAs. When the plurality of APs and STAs for transmitting the frame are present, each AP and/or STA has probably different backoff interval values and thus, may have different transmission time. When the specific APs or the STAs access the channel to transmit the frame, different APs and/or STAs confirm that the channel is occupied and cannot access the channel.

The backoff interval is determined by a random backoff count that is determined within the contention window (CW). The random backoff count is a pseudo random integer value and is selected as one of normal distributed values in a range of [0 CW]. The CW selects a $CW_{min}$ value as an initial value but is increased two times when the APs and/or the STAs fail to transmit the frame. The failure of the frame transmission may occur at the tie of collision. For example, when a receive acknowledgment frame (ACK frame) corresponding to the transmitted data frame is not received, it is determined that the collision is generated and the CW may be increased two times. The CW may be increased to $CW_{max}$ and is then fixed to the $CW_{max}$. When the frame transmission succeeds, the CW may be set to be the $CW_{min}$ again. The CW, the $CW_{min}$, and the $CW_{max}$ may be set to maintain $2^n-1$ for the convenience of implementation and operation. The backoff interval may be determined by a product of the random backoff count and the time slot. Therefore, as the random backoff count is increased, the STA performs and waits the random backoff for a longer period of time.

FIG. 1 is a diagram showing an example of a channel access method.

Referring to FIG. 1, an STA1 110, an STA2 120, an STA3 130, an STA4 140, and an STA5 150 contend one another for accessing the channel.

First, the STA3 130 senses the channel for the DIFS so as to transmit the frame (S113). It is confirmed that the channel is in the idle status.

The channel is not previously in a busy state and thus, the STA3 130 immediately accesses the channel to transmit the frame (S123). Therefore, the channel is maintained as a busy state for the corresponding time.

After the channel occupation by the STA2 120 ends, the STA1 110, the STA2 120, and the STA5 150 prepared to transmit the frame sense the channel for the DIFS for the channel access (S131, S132, and S135). It is confirmed that the channel is in the idle status.

When the channel is previously in a busy state, the STA1 110, the STA2 120, and the STA5 150 each perform the random backoff according to the random backoff count that is randomly determined within the CW range. In this case, the backoff interval of the STA2 120 is the shortest and therefore, accesses the channel after the backoff lapses to transmit the frame (S142).

The STA1 110 and the STA5 150 have a longer interval than that of the STA2 120 and therefore, cannot access the channel and uses as a next backoff interval a remaining backoff period $bo_r$ at which a lapsed backoff period $bo_e$ is reduced in the selected backoff interval.

After the channel occupation by the STA2 140 ends, the STA1 110, the STA4 140, and the STA5 150 prepared to transmit the frame sense the channel for the DIFS for the channel access (S151, S154, and S155). It may be confirmed that the channel is in the idle status.

Since the channel is previously in the busy state, the STA1 110, the STA4 140, and the STA5 150 perform the random backoff. The STA1 110 and the STA5 150 uses the remaining backoff period due to the previous backoff process as the backoff interval to perform the random backoff. The STA4 140 performs the random backoff according to the backoff interval determined according to the random backoff count selected within its own CW range.

In the exemplary embodiment of the present invention, the backoff interval selected by the STA4 140 is equal to the remaining backoff period of the STA5 150 and is shorter than the remaining backoff period of the STA1 110. In this case, the STA1 110 cannot access the channel and uses the remaining backoff period as the next backoff interval.

The STA4 140 and the STA5 150 are in the idle state after their own backoff interval and access each medium to transmit the frame (S164 and S165). However, the STA4 140 and the STA5 150 simultaneously access the channel to cause the collision. Therefore, the STA4 140 and the STA5 150 again perform the random backoff. In this case, the CW may extend two times to select the random backoff count within the corresponding range. For example, when the CW for the STA4 140 is 7 (represented by $2^3-1$), the CW for the next random backoff becomes 15 (represented by $2^4-1$). Therefore, the previous STA4 140 selects the random backoff count in the range of [0, 15] rather than selecting the random backoff count in the range of [0, 7].

After the channel occupation by the STA4 140 and the STA5 150 ends, the STA1 110, STA4 140, and STA5 150 prepared to transmit the frame sense the channel for the DIFS for the channel access (S171, S172, and S175). It may be confirmed that the channel is in the idle status.

When the channel is previously in a busy state, the STA1 110, the STA2 140, and the STA5 150 each perform the random backoff according to the random backoff count that is randomly determined within the CW range. In this case, the backoff interval of the STA1 110 is the shortest and therefore, accesses the channel after the backoff lapses to transmit the frame (S182). The STA4 140 and the STA5 150 fail to access the channel through the random backoff and attempts the channel access through the next random backoff.

Unlike the above-mentioned channel access method, there may be the STA in which the random backoff count value is set to a small fixed value and attempts the channel access based on the value. Hereinafter, like the existing channel access method, the STA using the CW having a varying value is referred to as a normal STA. On the other hand, the STA using the random backoff count value set as the relatively small and fixed value is referred to the abnormal STA.

The abnormal STA uses the relatively small ranod backoff count to attempt the channel access and can more easily access the channel than the relatively normal STA. On the other hand, it may be difficult for the normal STA to acquire an opportunity to transmit the signal through the channel access due to the frequent channel access of the abnormal STA.

For example, assume the WLAN environment in which the $CW_{min}$ of the normal STA is set to be 7 and the random backoff count value of the abnormal STA is set to be 2. When the normal STA and the abnormal STA prepare the frame to be transmitted, the abnormal STA performs the backoff corresponding to the backoff interval that is determined by a product of the random backoff count value set to 2 and a time slot. The general STA performs the random backoff corresponding to the backoff interval that is determined by a product of the random backoff count value randomly selected among a value of 0 to 7 and the time slot.

In the above example, assume the case in which the normal STA selects 4 as the random backoff count value. When the general STA and the abnormal STA simultaneously perform the random backoff, the abnormal STA acquires the channel access authority after 2*time slot period lapses and transmits the frame. The normal STA waits until the channel access of the abnormal STA ends.

After the channel access of the abnormal STA ends, the normal STA and the abnormal STA again perform the random backoff. In this case, the backoff interval of the normal STA is 2*time slot and the abnormal STA performs the random backoff corresponding to the 2*time slot period that is the remaining backoff interval through the previous random backoff. In this case, after the random backoff ends, the normal STA and the abnormal STA simultaneously access the channel, thereby causing the collision. Therefore, the normal STA increases the $CW_{min}$ from 7 (represented by $2^3-1$) to 15 (represented by $2^4-1$) and selects the random value within the corresponding range as the random backoff count. On the other hand, the abnormal STA continues to use 2 as the random backoff count value even though the collision occurs. Therefore, when the collision occurs, the abnormal STA may more increase the possibility to acquire the channel access authority than the normal STA. Therefore, it may be difficult to provide the normal service for the normal STA within the WLAN system.

A protocol supporting the channel access method defined in the existing WLAN system cannot allow the AP to acquire the CW related information that is changed according to the channel situation and the transmitted number of STAs, such that the AP and/or the receiver cannot determine the use situation of the channel. When the AP and/or the receiver cannot acquire the information regarding the channel situation, the AP and/or the receiver can provide the normal channel access method through the control of the CW related information, such as distributing the channel use authority to the STAs in response to the channel situation, limiting the channel access of the abnormal STA, or the like.

Hereinafter, the channel access method for the STA based on the method of controlling the channel access of the abnormal STA by transmitting and receiving the CW related information has been proposed. Hereinafter, the exemplary embodiment of the present invention describes the case in which a subject of controlling the channel access of the normal STA and the abnormal STA is assumed to be the AP, but the scope of the present invention is not limited thereto. The abnormal STA and/or the abnormal AP may also be present and the specific non-AP STA can also control the channel access of another normal/abnormal STA/AP.

In order for the AP to divide the abnormal STA, the STAs may transmit its own CW related information to the AP. In order to transmit the CW related information, the method for defining the new frame for the CW information and a scheme for including the CW related information in the header of the MAC frame may be suggested.

Figure 2:
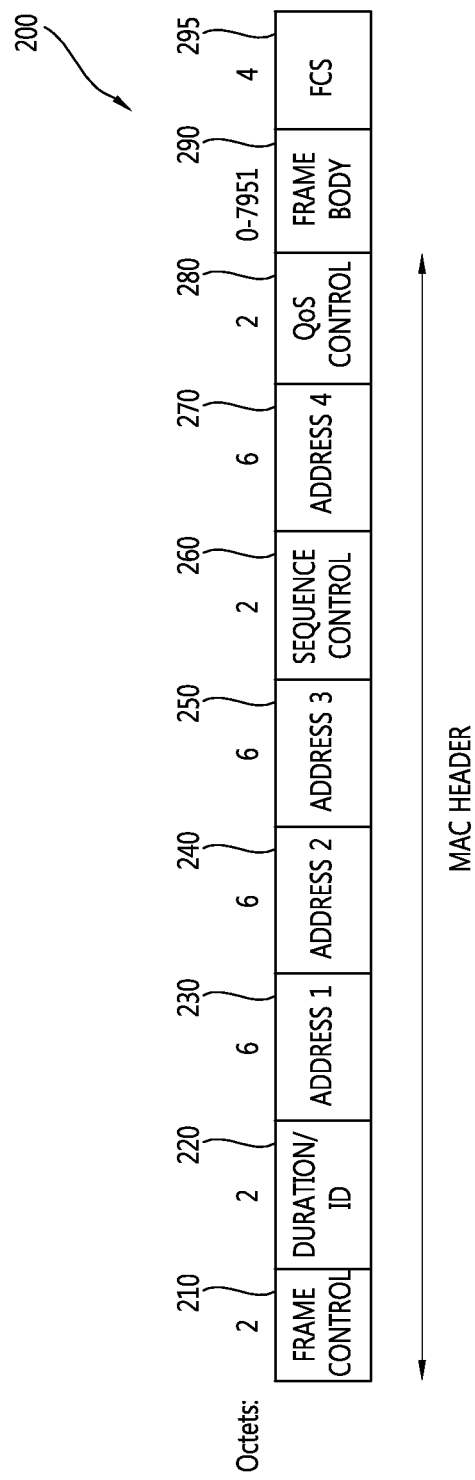
FIG. 2 is a block diagram showing an MAC frame format used in a WLAN system.

FIG. 2 is a block diagram showing an MAC frame format used in a WLAN system.

Figure 3:
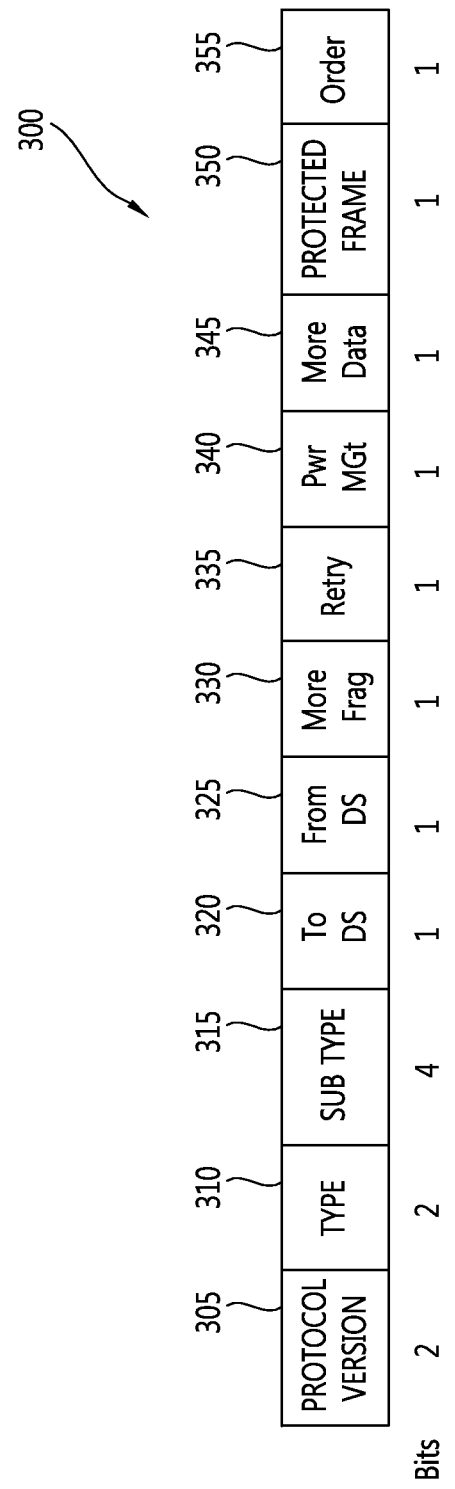
FIG. 3 is a block diagram showing a format of a frame control field of an MAC header.

Referring to FIG. 2, an MAC frame 200 includes a frame control field 210, a duration/ID field 220, an address 1 field 230, an address 2 field 240, an address field 3 field 250, a sequence control field 260, an address 4 field 270, a quality of service control field 280, a frame body 290, and an FCS field 295. FIG. 3 is a block diagram showing a format of a frame control field of an MAC header.

Referring to FIG. 3, the frame control field 210 includes a protocol version subfield 305, a type subfield 310, a subtype subfield 315, a TO DS subfield 320, a From DS subfield 325, a More Frag subfield 330, a Retry subfield 335, a Pwr Mgt subfield 340, a More Data subfield 345, a Protected frame subfield 350, and an Order subfield 335.

Each field included in the MAC frame 200 and the function and setting of each subfield included in the frame control field 300 are specifically specified in the IEEE 802.11 WLAN standard.

Referring to FIGS. 2 and 3, the fields configuring the MAC header may be present or may not be present according to the setting of the type subfield and the subtype subfield that are present in the frame control field 210.

The structure proposed in the exemplary embodiment of the present invention defines a new type in the subtype subfield 315 of the frame control field 210 and uses one of the reserved values as the detailed value of the newly defined type. When the value of the sub type subfield 315 indicates a newly set type, the field including the CW related information is added between the MAC header and the frame body. The above-mentioned frame format may be shown like FIG. 4.

Figure 4:
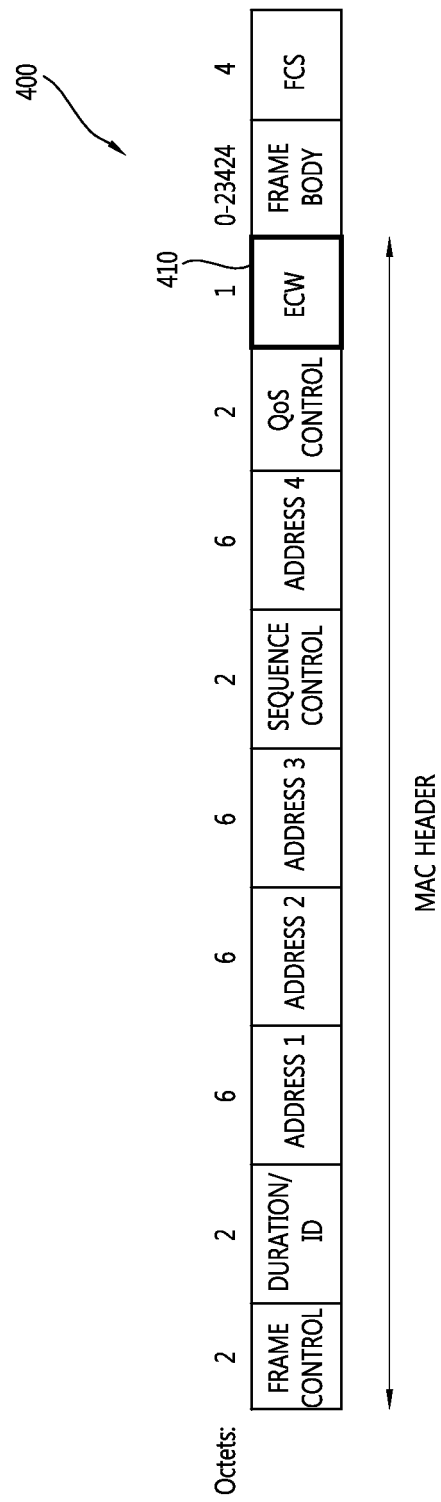
FIG. 4 is a block diagram showing a newly defined MCA frame format in accordance with an exemplary embodiment of the present invention.

FIG. 4 is a block diagram showing a newly defined MCA frame format in accordance with an exemplary embodiment of the present invention.

Referring to FIG. 4, in an MAC frame 400 in accordance with the exemplary embodiment of the present invention, the MAC header is further included in the ECW field 410. The ECW means an index of the CW set for the STA transmitting the MAC frame 400. That is, the CW may be given as the following Equation 1.

$$\text{Contention Window}=2^{ECW}-1 \quad \text{[Equation 1]}$$

The size of the ECW field 410 is 1 octet, that is, 8 bits. Among those, a bitstream having a 4 bit size is used to indicate the ECW and the remaining 4 bits may remain as reservation. The size of the CW is a maximum of 32767, which corresponds to $2^{15}-1$. Therefore, the ECW may be sufficient to indicate an integer of 0 to 15.

As shown in FIGS. 2 and 3, the MAC header newly includes an ECW field including the CW related information and may propose a method for defining one new action frame and using the same, unlike a setting method for allowing the sub type subfield of the frame control field of the MAC header to indicate the new type.

According to definition of an action frame in a management frame, a category value 127 of an action frame field is defined as vendor-specific and a new information element for each vendor may be defined and used. Therefore, a method for transmitting a frame including a new information element for the ECW has been proposed. The new information element in accordance with the exemplary embodiment of the present invention may be shown like FIG. 5.

Figure 5:
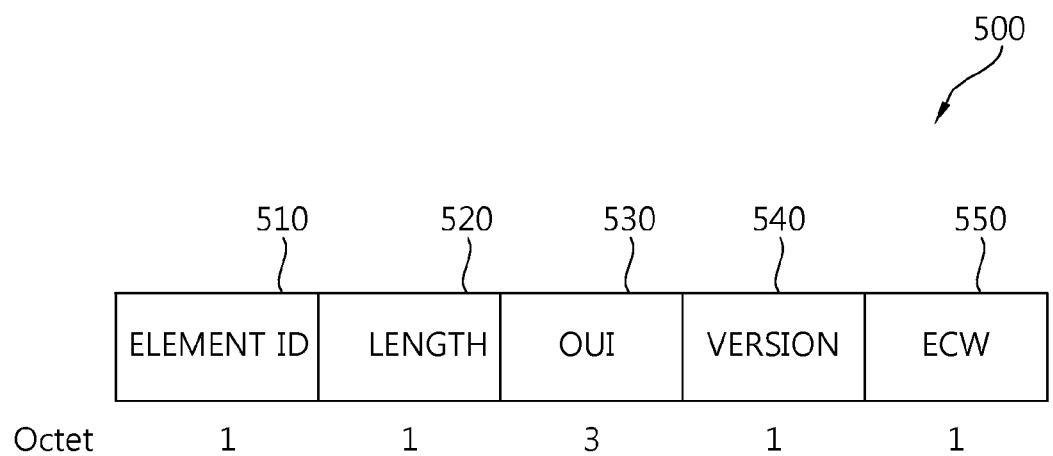
FIG. 5 is a block diagram showing a format of an ECW information element in accordance with the exemplary embodiment of the present invention.

FIG. 5 is a block diagram showing a format of the ECW information element in accordance with the exemplary embodiment of the present invention.

Referring to FIG. 5, an ECW information element 500 includes an element ID field 510, a length field 520, an OUI field 530, a version field 540, and an ECW field.

The element ID field 510 may be set to value 221 that is the vendor-specific, which indicates that the corresponding information element is the ECW information element 500. The length field 520 may indicate the length of the ECW information element 500 and may be set to indicate 5 like the exemplary embodiment of the present invention. The OUI field 530 may be set to be the vendor-specific value.

The ECW field 550 may be set to be equal to the ECW field 410 of FIG. 4. The ECW field may have a size of 1 octet in total. Among those, 4 bits are set to indicate the ECW and the remaining 4 bits may be set to be reserved bits.

The APs and/or the STAs may transmit and receive the CW related information by transmitting and receiving two types of frames including the CW related information.

Figure 6:
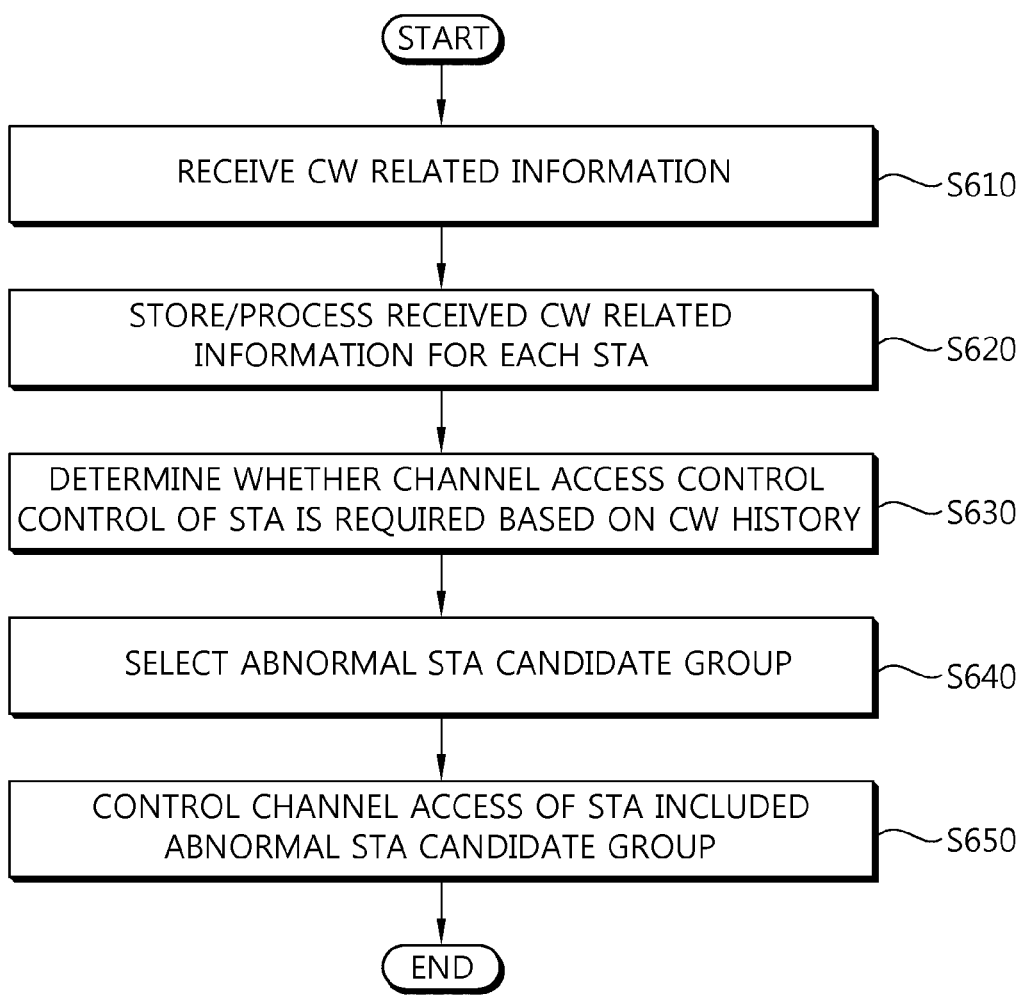
FIG. 6 is a flow chart showing a CW control based channel access method in accordance with the exemplary embodiment of the present invention.

FIG. 6 is a flow chart showing a CW control based channel access method in accordance with the exemplary embodiment of the present invention. A method in accordance with the flow chart of FIG. 6 may be performed by the APs.

In the WLAN system in which the abnormal STA is present, the normal STA increases the CW, more specifically, ECW at the time of causing the collision due to the wireless access. Therefore, when the STA having a low ECW is present under the situation that an average of the ECW values of the STAs included in the WLAN is increased, these STAs may be set and managed as one abnormal STA candidate group.

Referring to FIG. 6, the APs receive the frame transmitted by accessing the STAs to the channel and thus, receive the CW related information of the STAs (S610). The format of the frame transmitted by the STAs may be a format in which the MAC header includes the ECW field. The format of the frame transmitted by the STAs may be the frame format including the CW information element as shown in FIG. 4. The frame transmitted by the STA may include the CW related information in a form such as the ECW field.

The APs store and process the CW related information received from the STAs for each STA (S620). The APs may store the CW related information received at least once from each STA for the specific time by a history method. The CW history for each STA may be maintained for the predetermined time and discards the received CW related information when the specific time lapses and may include the newly received CW related information.

The AP may calculate an average of each CW related information included in the CW history for each STA, that is, the BCW values. An average value of the ECW value for each STA may be used as an index determining the transition in change of the random backoff interval of the corresponding STA.

The APs determines whether the channel access by the STA is controlled based on the CW history for each STA (S630). Increasing the average ECW value for the STA may mean that the collision frequently occurs while the STAs attempt the media access. This may be considered as the collision due to the presence of the abnormal STA. Therefore, the AP may determine as controlling the channel access by the STA when the average ECW value for the STA is increased to a specific threshold value or more.

The AP determining as controlling the channel access selects the abnormal STA candidate group (S640). The APs may include the corresponding STA in the abnormal STA candidate group when the AP satisfies the specific condition based on the processed CW history.

The APs may calculate and determine the overall ECW average for the overall STAs for the specific period based on the CW histories acquired for the specific period. The AP may group as the abnormal STA candidate group the STAs in which the average ECW value for the STA is a specific marginal value or less or less than a specific marginal value in the overall ECW average value in the overall ECW average value. In addition, the STA that does not transmit the CW related information may be included in the abnormal STA candidate group.

The AP controls the channel access of the STA included in the abnormal STA candidate group (S650). The STA transmitting the data to the AP by continuously accessing the channel specific times as the STA that is included in the abnormal STA candidate group is determined as the abnormal STA may the coupling with the corresponding STA.

The AP may continuously and repeatedly perform the method shown in FIG. 6 to control the channel access of the STA. As shown in FIG. 6, the AP may differentiate the STA that is likely to be the abnormal STA through the method for controlling channel access and prevent the frequent channel access from being caused by the corresponding STA. As a result, the service for the normal STA may be normally provided.

In addition, the AP can control the channel access of the STA based on its own CW related information when the AP does not receive the CW related information from only one STA. The AP attempts the channel access based on its own CW related information and the AP may determine a need to differentiate the abnormal STA candidate group when its own ECW value is higher than the specific threshold value and continuously access the specific time or more to control the channel access of the STA transmitting the data.

Figure 7:
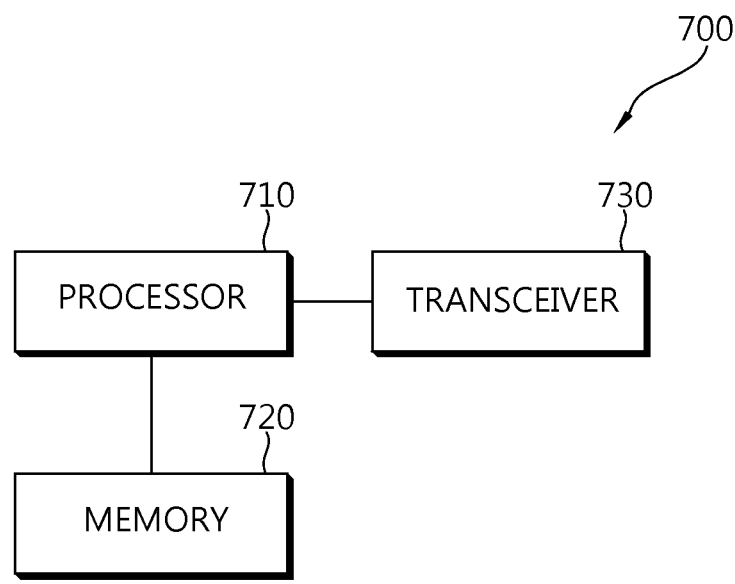
FIG. 7 is a block diagram showing a wireless apparatus to which the embodiment of the present invention may be applied.

FIG. 7 is a block diagram showing a wireless apparatus to which the embodiment of the present invention may be applied. The wireless apparatus may be the AP or the STA.

The wireless apparatus 700 includes a processor 710, a memory 720, and a transceiver 730. The transceiver 730 transmits/receives wireless signals and is configured to include a physical layer of the IEEE 802.11 A processor 710 is functionally connected to a transceiver 730 and is implemented to include an MAC layer and a physical layer of the IEEE 802.11. The processor 710 may be set to generate, transmit, and analyze the frame according to the frame format including the CW related information proposed by the exemplary embodiment of the present invention. The processor 710 may history and store the acquired CW related information, determines a need to differentiate the abnormal STA candidate group based on the information, and be set to configure the abnormal STA candidate group according to the above rule. The processor 710 may control the channel access of the STA included in the abnormal STA candidate group. The processor 710 may be set to implement the exemplary embodiment of the present invention that is described with FIGS. 2 and 6.

The processors 710 and/or the transceiver 730 may include an application-specific integrated circuit (ASIC), other chipsets, logical circuits, and/or data processing devices. The memory 720 may include a read-only memory (ROM), a random access memory m (RAM), a flash memory, a memory card, a storage medium, and/or other storage devices. When the embodiment is implemented by software, the above-mentioned method may be implemented by a module (process, function, or the like) that performs the above-mentioned function. The module may be stored in the memory 720 and be performed by the processor 710. The memory 720 may be in or out of the processor 710 and be connected to the processor 710 by a widely known various units.

The exemplary embodiments of the present invention can provide the method for allowing STAs configuring the WLAN system to provide the contention window (CW) related information and allowing the AP to control the channel access of the STAs based on the received AP CW related information. The AP can predict/determine whether the abnormal STAs are present based on the CW related information. The AP can divide the group the abnormal STA candidates based on the CW related information and control the channel access of the STAs included in the group. As a result, the exemplary embodiments of the present invention can normally provide the WLAN services for the general STAs by limiting the channel access of the STAs that are predicted as the abnormal STAs. Further, the exemplary embodiments of the present invention can support the efficiency service provision of the general WLAN system based on the contention based medium access.

The above-mentioned embodiments include examples of various aspects. Although all possible combinations showing various aspects are not described, it may be appreciated by those skilled in the art that other combinations may be made. Therefore, the present invention should be construed as including all other substitutions, alterations and modifications belong to the following claims.

What is claimed is:

1. A method performed by an access point (AP) for controlling channel access in a wireless system, the method comprising:
   receiving at least one frame from at least one station (STA) for a specific time period, each received frame including information associated with a contention window (CW) used when the frame is transmitted, the information including a CW reference value that is used to determine the CW, the CW reference value being an integer n, where:

$CW=2^n-1;$ processing the information associated with the CW for each STA;
   determining whether to control the channel access based on the processed information associated with the CW;
   selecting an abnormal STA candidate group when it is determined to control the channel access; and
   controlling the channel access to each STA included in the abnormal candidate STA group.

2. The method of claim 1, wherein processing the information associated with the CW includes determining a CW average value that is an average value for the CW reference values for each STA.

3. The method of claim 2, wherein determining whether to control the channel access based on the processed information associated with the CW includes determining that the CW average value equal to or greater than a specific control threshold value.

4. The method of claim 3, wherein processing the information associated with the CW includes determining an average CW reference value as an average value of the CW reference values for each STA.

5. The method of claim 4, wherein selecting the abnormal STA candidate group includes adding a corresponding STA in the abnormal STA candidate group when the average CW reference value is smaller than a specific marginal value based on the threshold value.

6. The method of claim 5, wherein controlling the channel access for each STA includes terminating a coupling state of the corresponding STA added to the abnormal STA candidate group.

7. The method of claim 6, wherein the CW reference value is included in a medium access control (MAC) of the frame.

8. The method of claim 6, wherein the frame is a management action frame having an information element that includes the information associated with the CW.

9. A wireless apparatus, comprising:
   a transceiver that transmits and receives a wireless signal; and
   a processor operably coupled with the transceiver, wherein the processor is configured for:
   receiving at least one frame from at least one station (STA) for a specific time period, each received frame including information associated with a contention window (CW) used when the frame is transmitted, the information including a CW reference value that is used to determine the CW, the CW reference value being an integer n, where:

$CW=2^n-1;$ processing the information associated with the CW for each STA;
   determining whether to control channel access based on the processed information associated with the CW;
   selecting an abnormal STA candidate group when it is determined to control the channel access; and
   controlling the channel access to each STA included in the abnormal candidate STA group.

10. The apparatus of claim 9, wherein processing the information associated with the CW includes determining a CW average value that is an average value for the CW reference values for each STA.

11. The apparatus of claim 10, wherein determining whether to control the channel access based on the processed information associated with the CW includes determining that the CW average value equal to or greater than a specific control threshold value.

12. The apparatus of claim 11, wherein processing the information associated with the CW includes determining an average CW reference value as an average value of the CW reference values for each STA.

13. The apparatus of claim 12, wherein selecting the abnormal STA candidate group includes adding a corresponding STA in the abnormal STA candidate group when the average CW reference value is smaller than a specific marginal value based on the threshold value.

14. The apparatus of claim 13, wherein controlling the channel access for each STA includes terminating a coupling state of the corresponding STA added to the abnormal STA candidate group.

15. The apparatus of claim 14, wherein he CW reference value is included in a medium access control (MAC) of the frame.

16. The method of claim 14, wherein the frame is a management action frame having an information element that includes the information associated with the CW.

* * * * *